United States Patent [19]

Baumgarten

[11] 4,019,221
[45] Apr. 26, 1977

[54] PAN HANDLE

[75] Inventor: Gerd D. Baumgarten, Wilnsdorf, Wilden, Germany

[73] Assignee: Heinrich Baumgarten, Eisen- und Blechwarenfabrik, Neunkirchen, Germany

[22] Filed: Mar. 15, 1976

[21] Appl. No.: 666,947

[52] U.S. Cl. .......................... 16/114 A; 220/94 R; 16/110 A
[51] Int. Cl.² ........................................ A47J 36/00
[58] Field of Search ............... 16/118, 121, 110 A, 16/114 A; 220/94 R

[56] References Cited
UNITED STATES PATENTS

| | | | |
|---|---|---|---|
| 1,954,062 | 4/1934 | Walter | 403/361 |
| 2,574,330 | 11/1951 | Judd | 292/353 |
| 2,731,662 | 1/1956 | Mills | 220/94 R |

FOREIGN PATENTS OR APPLICATIONS

| | | | |
|---|---|---|---|
| 1,072,504 | 6/1967 | United Kingdom | 16/121 |
| 1,231,647 | 5/1971 | United Kingdom | 403/365 |

Primary Examiner—Andrew V. Kundrat
Attorney, Agent, or Firm—Woodhams, Blanchard and Flynn

[57] ABSTRACT

A handle for a pan or lid. At least one spring is provided on the handle for holding the handle body to either the lid or the pan. The spring is received in a groove formed in the handle body and is in the form of a leaf spring having a bent over portion forming a hook. A cross-piece is provided and is secured to either the pan or the lid. The back side of the hook is braced against a shoulder formed on the handle body and the hook portion is urged into resilient engagement with the cross-piece to hold the handle body onto the pan or lid.

9 Claims, 9 Drawing Figures

PAN HANDLE

FIELD OF THE INVENTION

This invention relates to a pan handle comprising a handle body of plastics material, and at least one spring held in the handle body for the purpose of fastening the body to a cross-piece arranged to be joined to the pan.

BACKGROUND OF THE INVENTION

The use of springs instead of screws for the fastening of pan handles provides the advantage that the handle is fastened at all times without play. A prerequisite is that the spring or springs should be so dimensioned and disposed that they continuously press the body of the handle against the pan with sufficient force. It is not difficult to accommodate sufficiently powerful springs in the handle, but the space in the latter usually is not sufficient for springs which at the same time must bridge considerable manufacturing tolerances between the body of the handle and the cross-piece fastened to the pan, that is to say tolerances which are particularly great in the case of enamelled pans. The springs then have so great a volume that they can no longer be accommodated in the handle.

It is an object of the invention to construct a pan handle in such a manner that the spring force and the pressure applied by it to the handle are high, while tolerances and consequently the necessary spring deflections are small, so that despite its great power the spring can be kept small.

A further object of the invention is to shape and dispose the spring in such a manner that when a multi-part handle body is used, for example a handle body consisting of a knob and a base member, the spring holds the inidividual parts together and thus simplifies assembly.

Another object of the invention is to construct the spring so that the assembled pan handle can be pulled off by the application of sufficient force. This provides the advantage that, for example, a part of the handle can be replaced without the entire handle having to be destroyed.

Yet another object of the invention is to construct the handle in such a manner that the assembled handle cannot turn.

SUMMARY OF THE INVENTION

According to the invention, there is provided a pan handle comprising a handle body of plastics material, at least one spring held in the handle body for the purpose of fastening the body to a cross-piece arranged to be joined to the pan, wherein the spring is accommodated in a groove formed in the handle body and is a leaf spring having a part bent over to form a hook, wherein the cross-piece includes for the spring an abutment formed by an edge of the cross-piece, the arrangement formed by an edge of the cross-piece, the arrangement being such that in the assembled condition of the handle the spring bears with the back of the hook thereof against a shoulder formed on the handle body and with a part of the curved portion of the hook against one abutment edge of the cross-piece.

With this construction of the pan handle the tolerances between the spring abutments on the web and on the pan handle can be kept small and the spring forces kept great.

Two springs, which lie opposite one another in the handle and which may optionally be joined together by means of a bridge may be provided to fasten the body to the cross-piece.

BRIEF DESCRIPTION OF THE DRAWING

The invention will now be described, by way of example, with reference to the accompanying drawing, in which.

DETAILED DESCRIPTION

Figure 1:
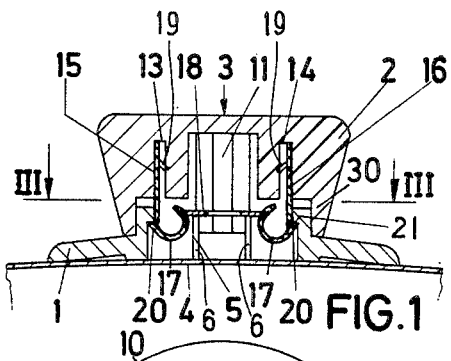
FIGS. 1 and 2 are sectional views, offset by 90°, through a pan handle embodying the invention.
Figure 2:
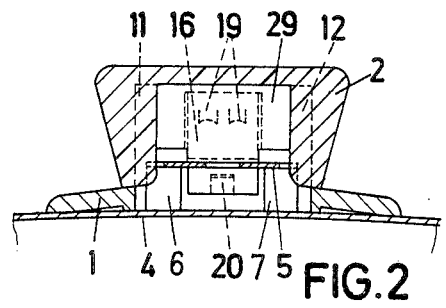
Figure 3:
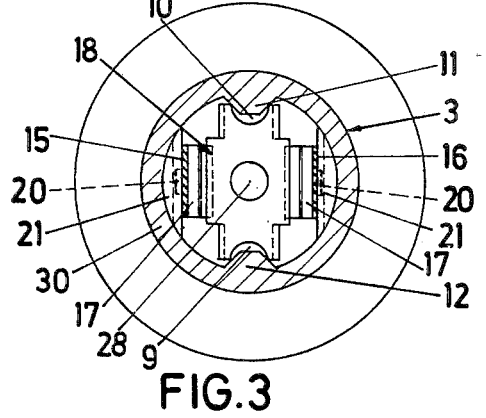
FIG. 3 is a section taken along the line III—III in FIG. 1.
Figure 8:
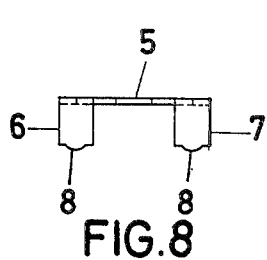
FIGS. 8 and 9 are side and plan views of a cross-piece by which the pan handle is fastened to a pan lid.
Figure 9:
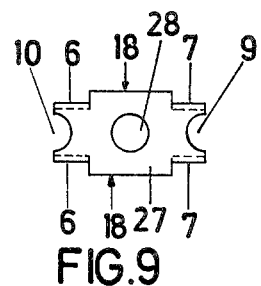

In FIGS. 1 to 3, a pan handle 3 is shown which comprises a two-part body formed by a circular base member 1 and a frustoconical knob 2 and which is fastened to the lid 4 of a pan, now shown. The base member 1 and knob 2 may be made of plastics material and are fastened to the lid by a U-shaped cross-piece 5, which is shown in FIGS. 8 and 9, and which is welded to the lid 4. As FIGS. 8 and 9 show, the cross-piece comprises a base portion and arms 6 and 7, which at their bottom ends are provided with weld spots 8, FIG. 8, for fastening the cross-piece to the lid 4.

The opposite ends of the base portion of the cross-piece 5 are provided with cut-outs or notches 9,10, in which protuberances 11,12 formed in the pan handle 3 are received, as described below. Between the arms 6 and 7 the base portion includes a flat portion 27 which has a hole 28 extending through the center thereof. The purpose of the hole 28 is to permit the handle to be fastened to a pan, if desired, by means of a screw. Opposite edges of the flat portion 27 form abutments 18, which remain free from enamel even when the cross-piece 5 is enamelled together with the lid. In addition, the width of the flat portion can be maintained with great accuracy.

The knob 2 has an elongated rectangualr recess 29 (FIG. 2) the shorter sides (FIG. 3) of which are formed by the protuberances 11 and 12, two narrow grooves 13,14, which extend parallel to the axis of the knob, and an annular flange 30 which engages over two shoulders 21 formed on the base member 1.

Figure 5:
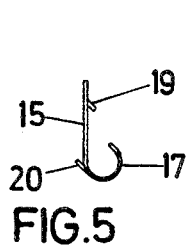
FIGS. 5 and 6 are front and side views of a spring embodied in the pan handle.
Figure 6:
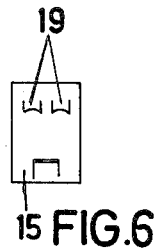

The grooves 13,14 in the knob serve to receive leaf springs 15,16. Each spring is provided with a hook 17 (FIGS. 5 and 6) which is intended to engage under the abutments 18 of the cross-piece 5. The portion of the spring which is seated in the grooves 13,14 is provided with two projecting tongues 19 arranged to bear against the walls of the grooves so as immovably to secure the spring at these points. A further tongue 20 projects from the junction of the hook 17 with the straight portion of the spring. The tongues 20 engage under the shoulders 21 formed on the base portion 1 and secure the base portion to the knob 2 even in the preassembled condition, thereby considerably facilitating assembly. After the pan handle has ben fitted to the lid the springs 15,16 thus couple three parts, namely the knob 2, the base portion 1, and the cross-piece 5.

Since the hooks 17 engage under the cross-piece 5 in the manner illustrated, that is to say with the aid of a curved portion, the handle 3 and the lid are joined together without play, but can nevertheless be disconnected to enable parts of the handle to be changed. Since, moreover, the distance between the two abutments 18 can be maintained with great accuracy, the distances of the hooks from the abutments are fixed with a close tolerance, that is to say the spring deflections or turning movements remain small.

As FIG. 3 shows, the protuberances 11,12 engage the notches 9,10 in the cross-piece 5 and thus prevent rotation of the assembled pan knob 2.

Figure 4:
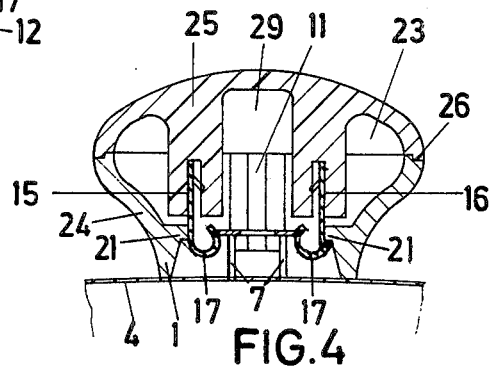
FIG. 4 is a sectional view through an alternative embodiment of a pan handle embodying the invention.

In FIG. 4, which shows another embodiment of the knob according to the invention, similar parts are given the same references as in FIG. 1. The pan handle differs from that shown in FIGS. 1 to 3 in respect of the shape of the base portion 24 and the knob 25, which together enclose a recess 23 extending around them, whereby material can be saved in the production of the handle. At the connection point the base portion 24 and the knob handle 25 are joined by a seam 26.

Figure 7:
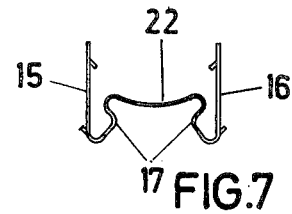
FIG. 7 illustrates an alternative form of spring.

FIG. 7 illustrates another embodiment of a spring for fastening a pan handle 3. This spring differs from that shown in FIGS. 5 and 6 only in that the two hooks 17 of the spring arms 15,16 are joined together by means of a bridge 22.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a handle for a utensil comprising a handle body of plastics material, a cross-piece for connection to said utensil, at least one spring held in said handle body for the purpose of fastening said handle body to said cross-piece, the improvement comprising wherein said handle body has means defining a groove therein and means defining a shoulder thereon, said spring is a leaf spring accommodated in said groove in said handle body, said leaf spring having a part bent over to form a hook having a curved portion, wherein said cross-piece includes for said leaf spring at least one abutment formed by an edge of said cross-piece, the arrangement being such that in the assembled condition of said handle body said leaf spring bears with the back of said hook thereof against said shoulder formed on said handle body and with a part of said curved portion of said hook against said one abutment edge of said cross-piece.

2. A utensil handle according to claim 1, wherein two springs are positioned opposite one another in said handle body and are arranged to fasten said handle body to said cross-piece.

3. A utensil handle according to claim 2, wherein said hooks of said two springs are joined together by a bridge.

4. A utensil handle according to claim 2, wherein each spring is retained in said groove in said handle body by one or more projecting tongues punched out of said leaf spring.

5. A utensil handle according to claim 1, wherein said handle body comprises a knob and a base portion, and wherein said base portion is provided with said shoulder engageable by said hook of said spring.

6. A utensil handle according to claim 5, wherein each spring has a tongue punched out of it for engagement beneath said shoulder.

7. A utensil handle according to claim 1, including at least one protuberance formed in said handle body and said cross-piece is provided with notches in which said protuberance is received.

8. A utensil handle according to claim 1, wherein said cross-piece comprises a sheet metal strip bent in U-form and which is adapted to be fastened to said utensil by the arms of the U, and wherein the base of the U-form cross-piece provides said abutment edges.

9. A utensil handle according to claim 8, wherein said base of said cross-piece has a hole through the center thereof.

* * * * *